(12) United States Patent
Chaplik et al.

(10) Patent No.: US 6,731,752 B1
(45) Date of Patent: May 4, 2004

(54) METHOD AND CIRCUIT FOR ECHO-CANCELLATION IN TWO-WAY COMMUNICATIONS

(75) Inventors: Naom Chaplik, San Diego, CA (US); Chanchai Poonpol, San Diego, CA (US); Mark T. Robinson, Carlsbad, CA (US)

(73) Assignee: Viadux, Inc., San Diego, CA (US)

( * ) Notice: Subject to any disclaimer, the term of this patent is extended or adjusted under 35 U.S.C. 154(b) by 658 days.

(21) Appl. No.: 09/708,403

(22) Filed: Nov. 8, 2000

(51) Int. Cl.[7] .............................. H04M 1/00; H04M 9/00
(52) U.S. Cl. ................ 379/402; 379/345; 379/390.04; 379/394; 379/388.06
(58) Field of Search ................ 379/90.01, 93.03, 379/93.05, 93.06, 406.01, 345, 344, 349, 386, 387.01, 388.06, 390.04, 391, 394, 399.01, 402, 403, 404, 413.02

(56) References Cited

U.S. PATENT DOCUMENTS

| | | | | |
|---|---|---|---|---|
| 5,280,526 A | * | 1/1994 | Laturell | 379/405 |
| 5,399,965 A | * | 3/1995 | Heberle | 324/117 H |
| 5,447,601 A | * | 9/1995 | Norris | 216/2 |
| 5,528,685 A | * | 6/1996 | Cwynar et al. | 379/405 |
| 5,528,686 A | * | 6/1996 | Cwynar et al. | 379/405 |
| 5,654,984 A | * | 8/1997 | Hershbarger et al. | 375/257 |
| 5,838,667 A | * | 11/1998 | Bingham et al. | 370/294 |
| 5,991,335 A | * | 11/1999 | Price | 375/219 |
| 6,069,899 A | * | 5/2000 | Foley | 370/494 |
| 6,111,949 A | * | 8/2000 | Sheets et al. | 379/414 |
| 6,144,659 A | * | 11/2000 | Nye et al. | 370/359 |
| 6,393,110 B1 | * | 5/2002 | Price | 379/93.01 |

* cited by examiner

Primary Examiner—Binh Tieu
(74) Attorney, Agent, or Firm—Gray Cary Ware & Freidenrich (57) ABSTRACT

A hybrid circuit models a plurality of attributes of a communication system including a subscriber line coupled to a line interface circuit. The plurality of attributes includes subscriber line impedance, and impedance of a coupling transformer. The attributes are based on other factors, such as whether or not bridge taps exist at or near the line interface circuit on the subscriber line. The plurality of attributes are modeled by a specific arrangement of resistive and capacitive elements to substantially duplicate the collective transformative effects of the attributes on a transmission signal being sent out on the subscriber line. The transmission signal is transformed and provided to an output, where it is subtracted from a composite signal representing a combination of the actual transformed transmission signal and a receive signal. The subtraction yields an isolated receive signal, which is later processed to recover the full receive signal.

13 Claims, 5 Drawing Sheets

METHOD AND CIRCUIT FOR ECHO-CANCELLATION IN TWO-WAY COMMUNICATIONS

BACKGROUND OF THE INVENTION

The present invention relates generally to data communications, and more particularly to a circuit for matching a digital transmission on a subscriber line, where the matched transmission is used for echo-cancellation.

Figure 1:
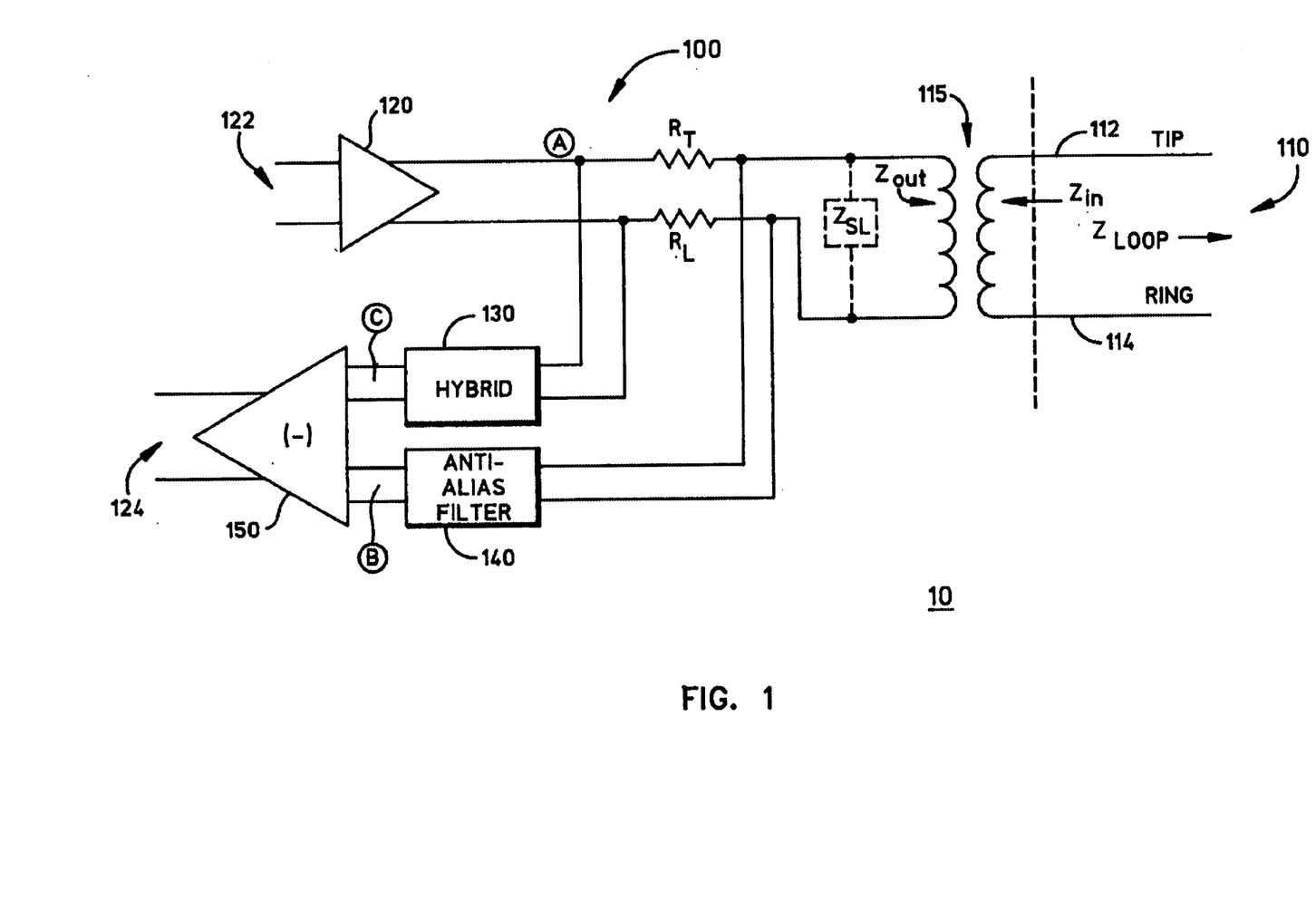
FIG. 1 shows a line interface to illustrate the function of a hybrid circuit.

FIG. 1 shows a communication system 10 which includes a subscriber line interface circuit 100 coupled to one end of a subscriber line 110. The subscriber line 110 is a communication medium for carrying voice and/or data signals. One example of a subscriber line 110 is a conventional telephone line comprised of a twisted-pair of copper wires. The subscriber line 110 includes a tip line 112 and a ring line 114. According to one configuration for which the present invention is suited, the subscriber line 110 is a two-way communication medium, whereby the tip and ring lines 112 and 114 together carry both signals being transmitted and signals being received. The outbound transmission signals and inbound receive signals overlap each other in both time and frequency domains on the communication medium. In effect, the communication medium carries a composite signal representing a combination of the transmission and receive signals at each moment in time and at the same frequency.

The line interface 100 includes a transmission path 122 and a receive path 124, each of which having lines corresponding to the tip line 112 and the ring line 114. The line interface 100 is coupled to the subscriber line 110, typically by a coupling transformer 115. A driver 120 drives transmission signals onto the subscriber line 110. The driver is preferably a low-impedance driver. A pair of isolation resistors $R_T$ and $R_L$ are matched to an impedance $Z_{SL}$ of the subscriber line at the transformer 115. The impedance $Z_{SL}$ is based on an impedance of the subscriber line $Z_{LOOP}$ as it is converted through the transformer 115, as seen through the turn ratio of the coils of the transformer 115. Secondarily, $Z_{SL}$ is also based on other attributes, such as capacitance, for example, of the transformer 115 and other potential circuit components of the line interface 100, which are not shown in FIG. 1.

Point A in FIG. 1 represents a point between the output of the driver 120 and the isolation resistors, $R_T$ and $R_L$. The driver 120 has a very low output impedance, approaching zero, so that transmission signals on the output of the driver 120 are not affected by signals being received. Thus, signals on the driver 120 side of isolation resistors $R_T$ and $R_L$ are largely, if not exclusively, transmission signals. On the subscriber line side of the terminal resistors $R_T$ and $R_L$, several attributes of the communication system 10 transform the transmission signals. The attributes include an impedance of the subscriber line 110 and an impedance of the coupling transformer 115 At that point, the transmission signals are also combined with, and affecting, the signals being received. Point B in FIG. 1 represents a point on the subscriber line interface circuit where transformed transmission signals are combined with receive signals.

As both receive and transmit signals are present on the subscriber line, and have overlapping spectral content, signals being received must be isolated from transmission signals at the receiving end, i.e. at the line interface circuit 100. However, such a procedure is very complex, due to the difficulty of determining the signal being transmitted and its effect on the signal being received. This difficulty exists because the transmission signals are transformed from a known signal at the point where they are output from the driver 120, to a transformed signal at the point where they reach a transformer coupled to the subscriber line 110, influenced by a plurality of transforming attributes. Most of the transformation is related to the attributes of the communication system 10 described above.

Signals arriving at the line interface 100 have attenuated extensively, and thus make up a smaller relative portion of the combined signal present on the subscriber line 110. Therefore, some line interfaces employ a device known as a hybrid circuit 130 to approximate the transformation of the transmission signals. The hybrid circuit 130 is configured to produce a simulated transformed transmission signal in order to remove any transformed transmission signals from the receive signals.

Operation of the line interface 100 shown in FIG. 1 occurs as follows. The hybrid circuit 130 receives a pure transmission signal from the driver, and transforms it based on approximated characteristics of the subscriber line at the line interface 100. A transformed transmission signal, representing a transmission signal that would occur at a point where it is combined with a receive signal, is passed to a subtractor 150. A composite signal, having both transmission signals and receive signals, is coupled and filtered by a filter 140, to remove aliasing or interfering frequencies. At the subtractor 150, the signal provided by the hybrid circuit 130 is subtracted from the composite signal provided by the filter 140, to theoretically yield only a receive signal. The recovered receive signal is then passed on for digital signal processing. The anti-aliasing filter 140 is normally provided separately from the hybrid circuit 130 to ensure a receive signal does not exhibit aliasing when the digitization process occurs in the DSP.

Conventional hybrid circuits, therefore, generally take a "known" signal being transmitted, and approximate how that signal will change in the presence of signal-transforming characteristics of the subscriber line. An approximated transmission signal is needed so that it may be removed from a receive signal. Accordingly, a hybrid circuit should model the transformative characteristics of the subscriber line on a transmission signal as accurately as possible. Conventional hybrid circuits are limited in how well they model those transformative characteristics of a given subscriber line.

SUMMARY OF THE INVENTION

The present invention is a circuit and method for modeling a plurality of attributes of a communication system, and their transformative effects on outbound transmission signals. The communication system includes both a line interface device that transmits outbound transmission signals and receives inbound receive signals, and a subscriber line that carries combined transmission and receive signals that overlap in time and frequency domains. The plurality of attributes collectively transform an outbound transmission signal such that, at a point where it is combined with a receive signal on the subscriber line, the outbound transmission signal is significantly altered. The attributes include impedances from various sources on the subscriber line and circuits of a line interface circuit. The present invention accurately models the plurality of attributes in order to substantially duplicate the transformative effects of the attributes on the outbound transmission signal, and provide an accurate copy of a transformed transmission signal for removal from the receive signal.

In an embodiment of the invention, a circuit includes an input/output section that couples an outbound transmission signal to provide a copy of a transmission signal at an input of the circuit, and a filter section, connected to the input, for filtering aliasing frequencies from the transmission signal. The circuit further includes a modeling section, connected to the filter section. The modeling section is configured to model a plurality of attributes of the communication system, wherein the model transforms the copy of the transmission signal to substantially duplicate the transformative effects of the plurality of attributes on the outbound transmission signal, and for providing a transformed transmission signal to an output of the circuit at the input/output section.

In another embodiment of the invention, a method includes the steps of coupling an outbound transmission signal to provide a copy of a pure transmission signal that is unaltered by transformative attributes of the communication system. The method further includes filtering the copy of the transmission signal to remove aliasing frequencies, and transforming the filtered copy of the transmission signal based on a model of a plurality of attributes of the communication system, wherein the model substantially duplicates the transformative effects of the plurality of attributes on the outbound transmission signal. The transformed copy of the transmission signal is then provided as an output, for subtraction from the receive signal.

DETAILED DESCRIPTION OF THE PREFERRED EMBODIMENTS

The present invention is an improved hybrid circuit and method thereof of the same, where a plurality of attributes of a communication system are modeled by a specific arrangement of resistors and capacitors. The arrangement models the attributes from a point where the transmission signal is provided to the subscriber line, to a point where the transmission signal is combined with a receive signal. The arrangement thus substantially duplicates the transformative effects of the attributes on a transmission signal provided on the subscriber line. The modeled attributes are then applied to a coupled transmission signal as it is being transmitted onto a subscriber line. The hybrid circuit according to the present invention provides a transformed transmission signal which may be removed from a receive signal, to recover a clean receive signal.

Generally, a method and circuit for the hybrid circuit 130, in accordance with the invention, accurately generates a transfer function of a transmission signal between points A and C in FIG. 1, such that it matches a transfer function of the transmission signal between points A and B.

Figure 2:
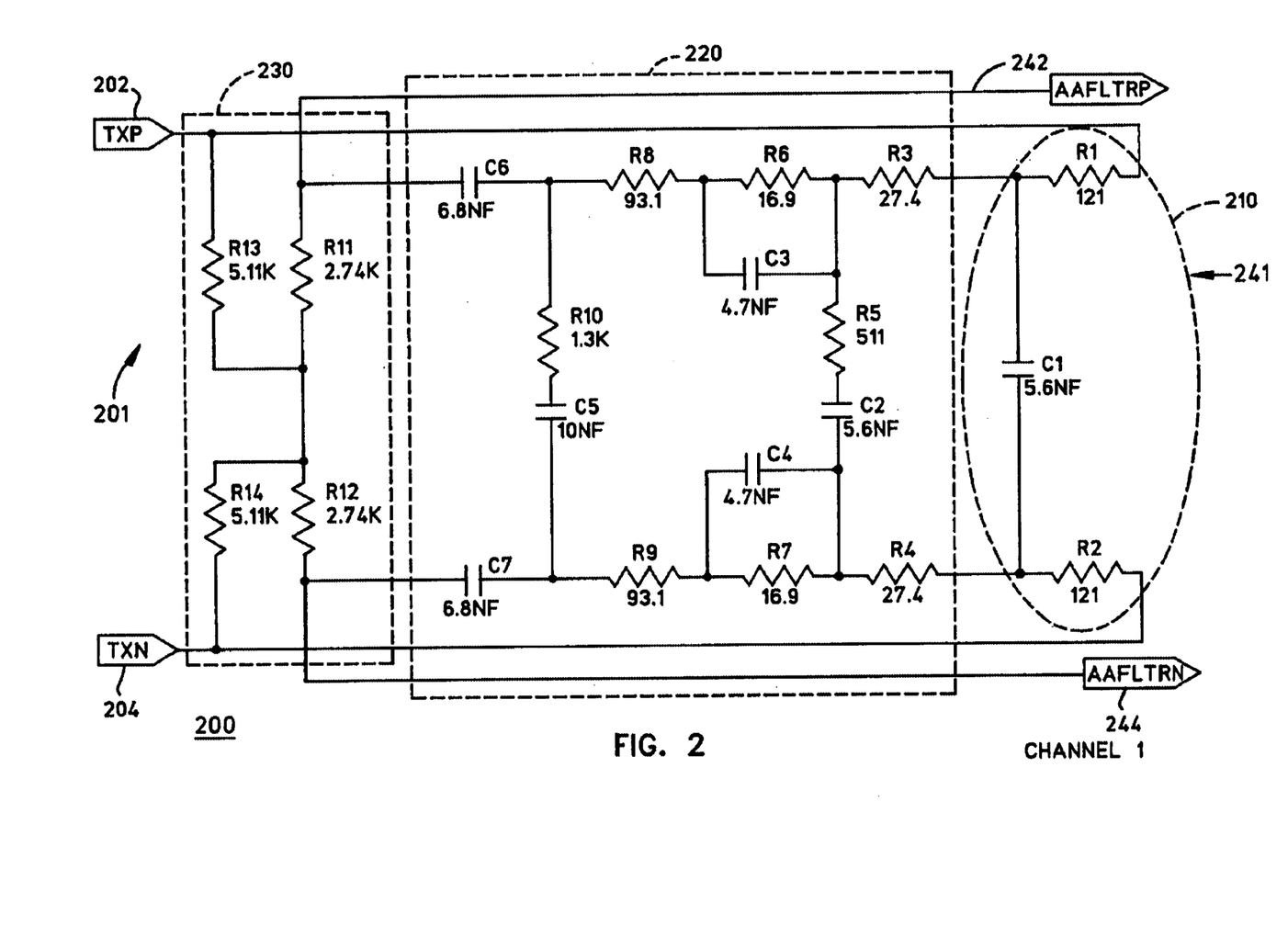
FIG. 2 is a circuit schematic diagram of an improved hybrid circuit according to one preferred embodiment of the present invention.

FIG. 2 is a circuit schematic diagram of one embodiment of a hybrid circuit 200 according to the invention. According to FIG. 2, and with reference to the communication system 10 shown in FIG. 1, a hybrid circuit 200 is illustrated for a subscriber line 110 that has no bridge taps near the line interface 100. The hybrid circuit 200 includes a signal input 201 having a first line 202 and a second line 204. According to one exemplary embodiment, the signal input is a differential input, the first line 202 carries a positive signal, and the second line 204 carries a negative signal. In an alternative embodiment, however, the signal input 201 may be a single-ended connection to the subscriber line 110, which may or may not be carrying a differential pair of signals.

In the exemplary embodiment, the signal input 201 receives a transmission signal from the line interface 100 connected to the subscriber loop 110, and provides the signal as a differential signal on the first input line 202 and the second input line 204. The first input line 202 and the second input line 204 correspond to respective tip and ring lines of a common two-wire, twisted pair cable that makes up a subscriber line 110. According to the invention, transmission signals, as well as signals being received, are transmitted according to a digital subscriber line (DSL) protocol. There are several varieties of DSL, which are collectively known as xDSL. In a preferred embodiment, the transmission protocol is symmetrical DSL (SDSL), in which the speed of transmission signals is the same as the speed of signals being received. Another symmetrical DSL for which the present invention is suited is high bit rate DSL (HDSL).

The signal input 201 is coupled to an input/output (I/O) section 230 of the hybrid circuit 200. The I/O section 230 is made up of resistive elements configured to remove a DC component of the transmission signal on the input 201, and restore that DC component to a transformed transmission signal on an output 241.

The signal input 201 and I/O section 230 are coupled to a filter section 210. The filter section 210 is adapted to remove any frequencies outside the frequency band of the transmission signal, in order to minimize alias signals that might occur upstream during eventual digital processing of receive signals. The filtered AC component of the transmission signal is provided to a modeling section 220. The modeling section 220 is configured to model a plurality of attributes of the subscriber line 110 and line interface 100 that transform a transmission signal from a point where the transmission signal is provided to the subscriber line, i.e. point A in FIG. 1, to a point where the transmission signal is combined with a receive signal, i.e. point B in FIG. 1. The plurality of attributes are modeled so as to substantially duplicate a collective transformative effect of the attributes on the transmission signal. In an exemplary embodiment, the modeling section 220 is an arrangement of resistive and capacitive elements configured to model a transfer function of the communication system 10 from the output of the driver 120 to the opposite side of the isolation resistors $R_T$ and $R_L$.

The modeling section 220 of the hybrid circuit 200 is further configured to provide a transformed transmission signal, representing the AC component of the transmission signal as transformed by the specific modeled attributes of the communication system 10. The transformed transmission signal is provided back to I/O section 230 for restoration of the DC component to the signal. The restored and transformed transmission signal is then provided to an output 241, which includes a first line 242 and a second line 244 for carrying a differential signal.

According to a specific exemplary embodiment shown in FIG. 2, the filter section 210 includes a resistor R1 connected to the first input line 202, a resistor R2 connected to the second input line 204, and a capacitor C1 connected to the first and second resistors R1 and R2, opposite the first and second input lines 202 and 204, respectively. In an exemplary embodiment, R1 and R2 are 121Ω, 1% tolerance resistors, and C1 is a 5.6 nF, 5% tolerance capacitor.

In the specific exemplary embodiment of the hybrid circuit 200, the modeling section 220 includes a first combination of a resistor R3, a resistor R6, a resistor R8 and a capacitor C6, connected in series, and wherein the capacitor C6 is connected to the first output line 242, and a second serial combination of a resistor R4, a resistor R7, a resistor R9 and a capacitor C7, connected in series, and wherein the capacitor C7 is connected to the second output line 244. The modeling section 220 further includes a capacitor C3 connected in parallel with the resistor R6, a capacitor C4 connected in parallel with the resistor R7, a resistor R5 connected between resistors R3 and R6, and a capacitor C2 connected between resistors R4 and R7 and connected to the resistor R5. The modeling section 220 further includes a resistor R10 and a capacitor C5. The resistor R10 is connected to a node between the resistor R8 and the capacitor C6. The capacitor C5 is in turn connected to a node between the resistor R9 and the capacitor C7, and connected to the resistor R10.

In the specific exemplary embodiment illustrated with reference to FIG. 2, R3 and R4 are 27.4Ω resistors, R5 is a 511Ω resistor, R6 and R7 are 16.9Ω resistors, R8 and R9 are 93.1Ω resistors, and R10 is a 1.3 kΩ resistor. All resistors in the modeling section 220 preferably are 1% tolerance. The capacitor C2 is a 5.6 nF capacitor, C3 and C4 are 4.7 nF capacitors, C5 is a 10 nF capacitor, and C6 and C7 are 6.8 nF capacitors. All capacitors in the modeling section 220 are preferably 5% tolerance.

The input/output (I/O) section 230 of the hybrid circuit 200 includes a resistor R11 connected to the first output line 242, a resistor R12 connected between the resistor R11 and the second output line 244, a resistor R13 connected to a node between the resistors R11 and R12, and connected to the first input line 202, and a resistor R14 connected to the node between the resistors R11 and R12, and connected to the second input line 204. In the exemplary embodiment, R11 and R12 are 2.74 kΩ resistors, and R13 and R14 are 5.11 kΩ resistors, all of which preferably having 1% tolerance.

Figure 3A:
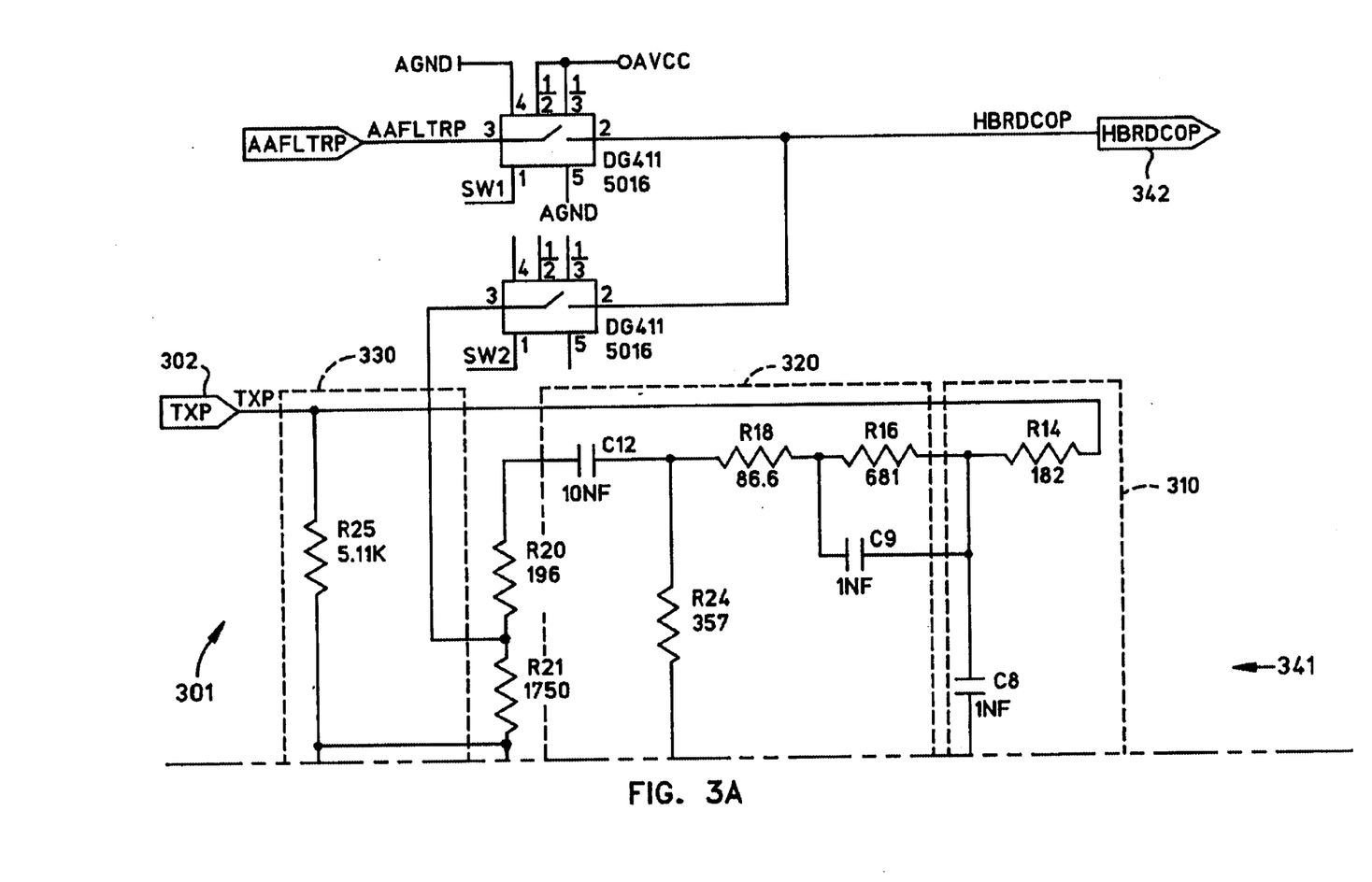
FIG. 3 is a circuit schematic diagram of an improved hybrid circuit according to a second preferred embodiment of the present invention.
Figure 3B:
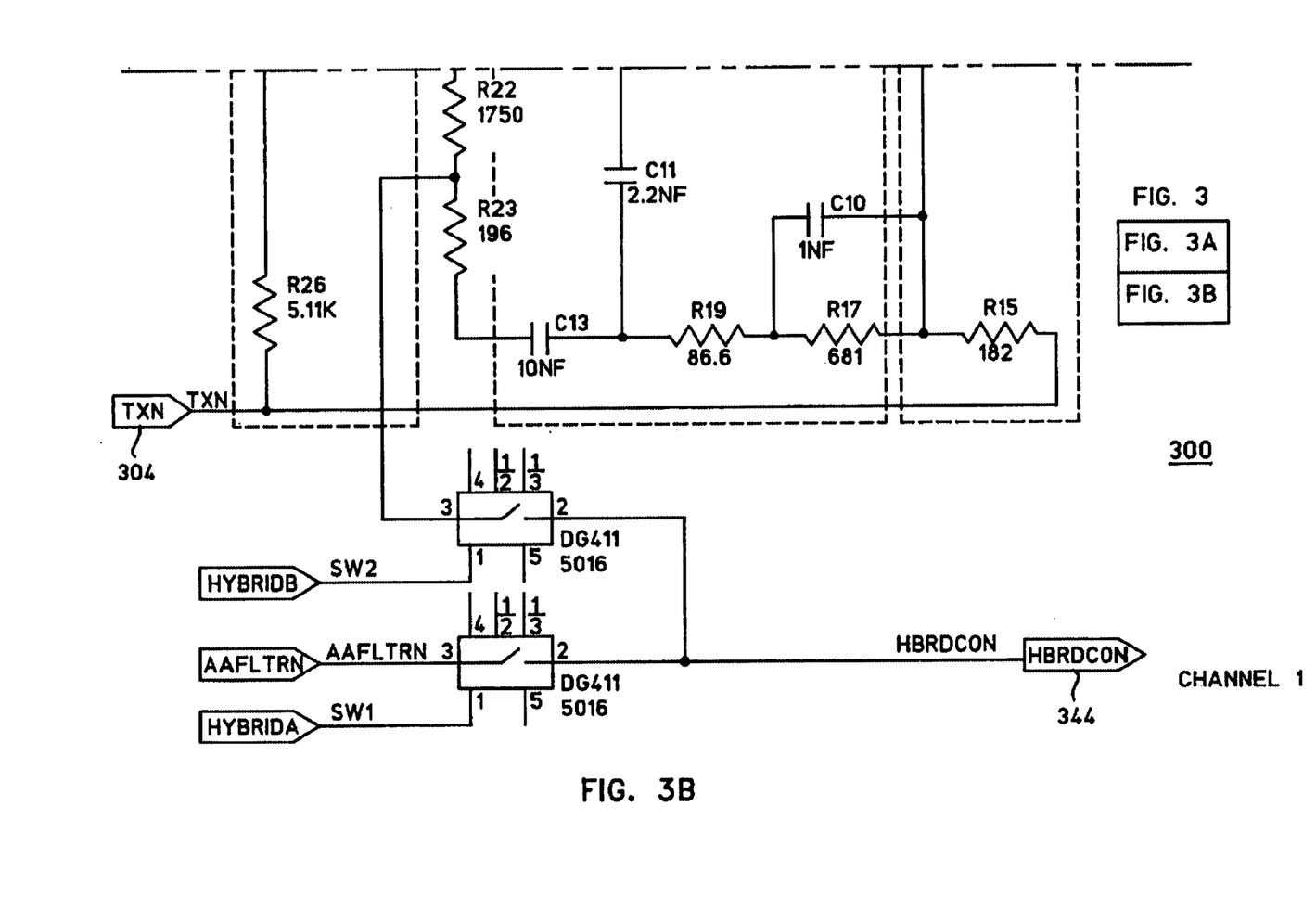

FIG. 3 shows an alternative exemplary embodiment of a hybrid circuit 300 according to the present invention. Hybrid circuit 300 is adapted for a case where a subscriber line includes one or more taps to other subscriber lines near the line interface. The circuit 300 includes a signal input 301 having a firsts line 302 and a second line 304, which are preferably arranged as a differential pair of wires, but which may be a single-ended input connection to a differential subscriber line 110. The signal input 301 corresponds to the tip and ring lines of the subscriber line 110. The circuit 300 includes a filter section 310 for removing aliasing frequencies, as discussed above, and a modeling section 320 for modeling a plurality of attributes of the communication system 10 to substantially duplicate the collective transformative effects thereof on the transmission signal. The modeling section 320 provides a transformed transmission signal to an output 341. The circuit 300 further includes an input/output section 330 for removing and restoring a DC component of the transmission signal before and after it is transformed, respectively. The output may also be a differential pair of wires, and includes a first line 342 and a second line 344.

According to the embodiment shown in FIG. 3, the filter section 310 includes a resistor R14 connected to the first input line 302, a resistor R15 connected to the second input line 304, and a capacitor C8 connected to opposite sides of the resistors R14 and R15 from the input lines 302 and 304. In an exemplary embodiment, R14 and R15 are 182Ω, 1% tolerance resistors, and C8 is a 1.0 nF, 5% tolerance capacitor.

In the alternative exemplary embodiment of the hybrid circuit 300, the modeling section 320 includes a first combination of a resistor R16 and a capacitor C9, connected in parallel, and a second combination of a resistor R17 and a capacitor C10, coupled in parallel. The modeling section 320 further includes a third combination of a resistor R18, a capacitor C12, and a resistor R20 connected in series, wherein the resistor R18 is connected to the first combination, and a fourth combination of a resistor R19, a capacitor C13, and a resistor R23, connected in series, wherein the resistor R19 is connected to the second combination. A fifth combination of a resistor R24 and a capacitor C11 is connected in series, wherein the resistor R24 is connected to a node between the resistor R18 and the capacitor C12, and wherein the capacitor C11 is connected to a node between the resistor R19 and the capacitor C13.

In the exemplary alternative embodiment 300, R16 and R18 are 681Ω resistors, R18 and R19 are 86.6Ω resistors, and R24 is a 357Ω resistor. The resistors R20 and R23 are 196Ω resistors. As illustrated in FIG. 3, C9 and C10 are 1 nF capacitors, C11 is a 2.2 nF capacitor, and C12 and C13 are 10 nF capacitors. All resistors in the modeling section 320 are preferably 1% tolerance, and all capacitors are 5% tolerance.

The I/O section 330 includes a first combination of a resistor R21 and a resistor R22, connected in series. The I/O section further includes a second combination of a resistor R25 and a resistor R26, connected in series. The resistor R25 is connected to the first input line 302 and the resistor R26 is connected to the second input line 304. The resistor R21 is connected to the first output line 342, and the resistor R23 is connected to the second output line 344. A node between the resistor R21 and the resistor R22 is connected to a node between the resistor R25 and the resistor R26. In an example circuit 300, resistors R25 and R26 are 511Ω, 1% tolerance resistors. Resistors R21 and R22 are 1.75 kΩ resistors, also 1% tolerance.

The hybrid circuits described above may be included in a single circuit, for switching between a circuit according to either embodiment. Each circuit, 200 and 300 respectively, is modeled for specific impedance conditions and subscriber line characteristics, based in part on an existence and number of bridge taps from the subscriber line to which they are coupled, for example. A measurement of the impedance may be made on the subscriber line, and a switch is then activated to energize one or the other of the hybrid circuits 200 or 300, in order to optimize the signal approximation function of the hybrid circuit and improve receive signal quality.

Figure 4:
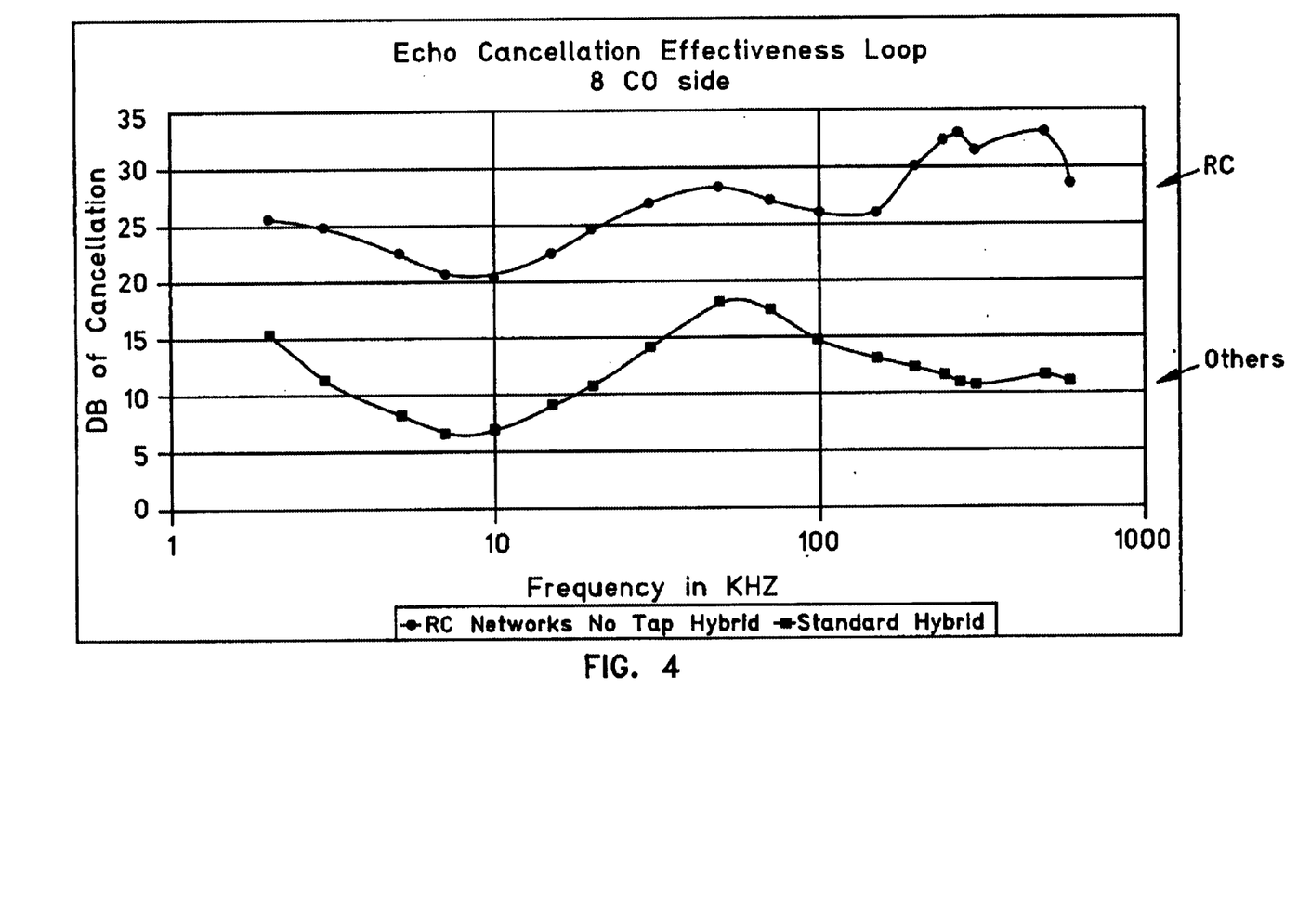
FIG. 4 is a chart illustrating improved echo cancellation effects of a hybrid circuit according to the invention.

FIG. 4 illustrates a benefit of a hybrid circuit 200 relative to prior art hybrid circuits. Again, the main function of general hybrid circuit is to characterize signals being transmitted, so that they may be removed from receive signals which they overlap on a transmission medium. The better the characterization, the more of the signal being transmitted is removed. Even after removal, residual frequency response of a signal being transmitted remains, creating "echo" signals along with the signal being received. In FIG. 4, the amount dB of echo cancellation by a circuit according to the present invention is far greater than typical hybrid circuits, in the frequency range of 1 to 1000 kHz.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. In a communication system having a subscriber line carrying outbound transmission and inbound receive signals overlapping in time and frequency domains, a circuit for providing transmission signals for removal from receive signals at a subscriber line interface, comprising:

an input/output section that couples an outbound transmission signal to provide a copy of the transmission signal at an input of the circuit;

a filter section, connected to the input, for filtering aliasing frequencies from the copy of the transmission signal; and a modeling section, connected to the filter section, and being configured to model a plurality of attributes of the communication system, wherein the model transforms the copy of the transmission signal to substantially duplicate the transformative effects of the plurality of attributes on the outbound transmission signal, and for providing a transformed transmission signal to an output of the circuit at the input/output section.

2. The circuit according to claim 1, wherein the plurality of attributes include an impedance of the subscriber line and an impedance of the line interface.

3. The circuit according to claim 1, wherein the input includes a first line and a second line, and wherein the output includes a first line and a second line.

4. The circuit according to claim 3, wherein the filter section comprises a first resistor connected to the first input line, a second resistor connected to the second input line, and a capacitor connected to the first and second resistors opposite the first and second input lines, respectively.

5. The circuit according to claim 3, wherein the modeling section comprises:

a first combination of a resistor R3, a resistor R6, a resistor R8 and a capacitor C6, connected in series, and wherein the capacitor C6 is connected to the first output line;

a second combination of a resistor R4, a resistor R7, a resistor R9 and a capacitor C7, connected in series, and wherein the capacitor C7 is connected to the second output line;

a capacitor C3 connected in parallel with the resistor R6;

a capacitor C4 connected in parallel with the resistor R7;

a resistor R5 connected between resistors R3 and R6;

a capacitor C2 connected between resistors R4 and R7, and connected to the resistor R5;

a resistor R10 connected to a node between the resistor R8 and the capacitor C6; and a capacitor C5 connected to a node between the resistor R9 and the capacitor C7, and connected to the resistor R10.

6. The circuit according to claim 3, wherein the input/output section is adapted to remove a DC component from the copy of the transmission signal at an input of the circuit, and to restore the DC component to the copy of the transmission signal at an output of the circuit, and wherein the input/output section further comprises:

a resistor R11 connected to the first output line;

a resistor R12 connected between the resistor R11 and the second output line;

a resistor R13 connected to a node between the resistors R11 and R12, and connected to the first input line; and a resistor R14 connected to the node between the resistors R11 and R12, and connected to the second input line.

7. The circuit according to claim 3, wherein the modeling section comprises:

a first combination of a resistor R16 and a capacitor C9, connected in parallel;

a second combination of a resistor R17 and a capacitor C10, coupled in parallel;

a third combination of a resistor R18, a capacitor C12, and a resistor R20, connected in series, wherein the resistor R18 is connected to the first combination;

a fourth combination of a resistor R19, a capacitor C13, and a resistor R23, connected in series, wherein the resistor R19 is connected to the second, combination;

a fifth combination of a resistor R24 and a capacitor C11, connected in series, wherein the resistor R24 is connected to a node between the resistor R18 and the capacitor C12, and wherein the capacitor C11 is connected to a node between the resistor R19 and the capacitor C13.

8. The circuit according to claim 3, wherein the input/output section is adapted to remove a DC component from the copy of the transmission signal at an input of the circuit, and to restore the DC component to the copy of the transmission signal at an output of the circuit, and wherein the input/output section further comprises:

a first combination of a resistor R21 and a resistor R22, connected in series; and a second combination of a resistor R25 and a resistor R26, connected in series, wherein the resistor R25 is connected to the first input line and the resistor R26 is connected to the second input line;

wherein the resistor R21 is connected to the first output line, the resistor R23 is connected to the second output line, and a node between the resistor R21 and the resistor R22 is connected to a node between the resistor R25 and the resistor R26.

9. In a communication system having a subscriber line carrying overlapping transmission and receive signals in time and frequency domains, a method of providing the transmission signal for removal from the receive signal at a line interface, comprising:

coupling an outbound transmission signal to provide a copy of a pure transmission signal;

filtering the copy of the transmission signal to remove aliasing frequencies;

transforming the filtered copy of the transmission signal based on a model of a plurality of attributes of the communication system, wherein the model substantially duplicates the transformative effects of the plurality of attributes on the outbound transmission signal; and outputting the transformed copy of the transmission signal.

10. The method of claim 9, wherein the plurality of attributes includes an impedance of the subscriber line at a point on the subscriber line where the outbound transmission signal is combined with a inbound receive signal.

11. The method of claim 10, wherein the plurality of attributes further includes impedance characteristics of circuit components of the line interface.

12. The method of claim 9, further comprising removing a DC component of the copy of the transmission signal before the transforming, and restoring the DC portion to the transformed copy of the transmission signal.

13. A circuit for modeling a digital transmission on a two-way communication system, comprising:

an input that couples an outbound transmission signal from a transmission device to provide a copy of the transmission signal prior to being combined with an inbound receive signal on the communication system, wherein a bandwidth of the inbound receive signal is approximately equal to a bandwidth of the outbound transmission signal;

a modeling section connected to the input, comprising a plurality of resistive elements and a plurality of capacitive elements, the resistive and capacitive elements arranged so as to model a plurality of attributes of the communication system carrying the combined transmission and receive signals which overlap in time and frequency domains, the modeling section being further configured to substantially duplicate on the copy of the transmission signal the transformative effects of the plurality of attributes on the outbound transmission signal; and an output connected to the modeling section that provides transformed copy of the transmission signal.

* * * * *